H. CARTMILL.
COMBINED SPARK PLUG AND TESTING DEVICE.
APPLICATION FILED AUG. 11, 1919.

1,355,310. Patented Oct. 12, 1920.

Inventor
Holley Cartmill
By Herbert E. Smith
Attorney

UNITED STATES PATENT OFFICE.

HOLLEY CARTMILL, OF SPOKANE, WASHINGTON.

COMBINED SPARK-PLUG AND TESTING DEVICE.

1,355,310.　　　Specification of Letters Patent.　　Patented Oct. 12, 1920.

Application filed August 11, 1919. Serial No. 316,745.

*To all whom it may concern:*

Be it known that I, HOLLEY CARTMILL, a citizen of the United States, residing at Spokane, in Spokane county and State of Washington, have invented certain new and useful Improvements in Combined Spark-Plugs and Testing Devices, of which the following is a specification.

The present invention relates to improvements in combined spark plug and testing devices for use in connection with internal combustion engines, whereby the spark plug, in addition to performing its usual functions, may be utilized for testing the characteristics of the charge in the cylinder, and also utilized for testing various features of the electrical connections of the gas engine or internal combustion engine.

The primary object of the invention is the provision of a compactly arranged and simple device involving the spark plug and connections, for finding and eliminating troubles in connection with the charge of the engine and with the electrical connections as will be hereinafter pointed out, and the invention consists in certain novel combinations and arrangements of parts to be claimed.

In the accompanying drawings one complete example of the physical embodiment of my invention is illustrated, the parts being combined and arranged according to the best mode I have so far devised for the practical application of the principles of my invention.

Figure 2:
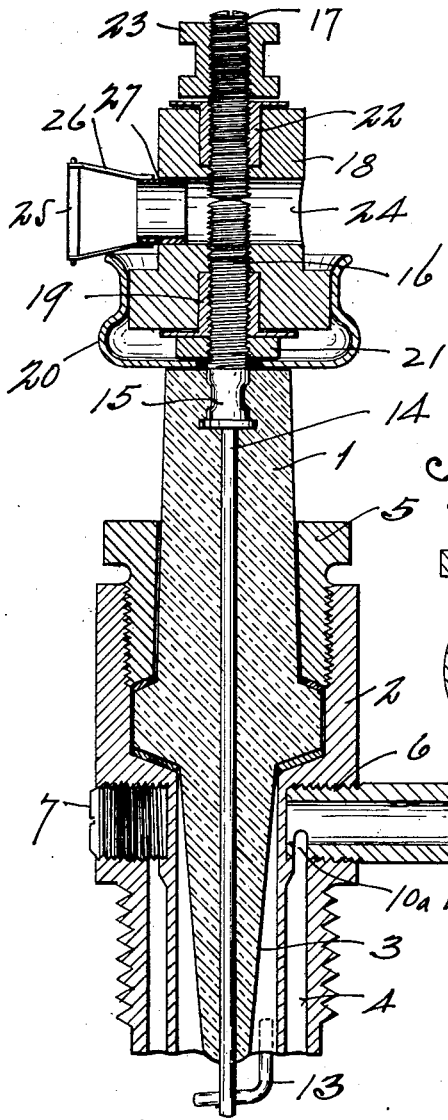
Fig. 2 is an enlarged, vertical, central sectional view of the spark plug and its combined features.
Figure 1:
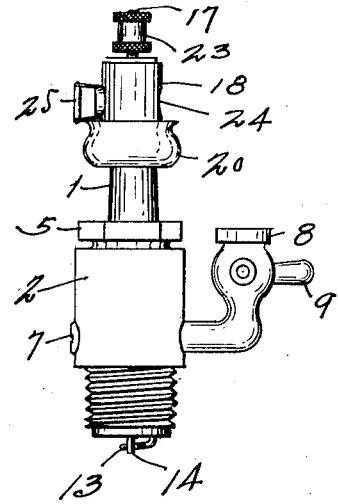
Figure 1 is a view in elevation showing a spark plug embodying the novel features of the invention.
Figure 4:
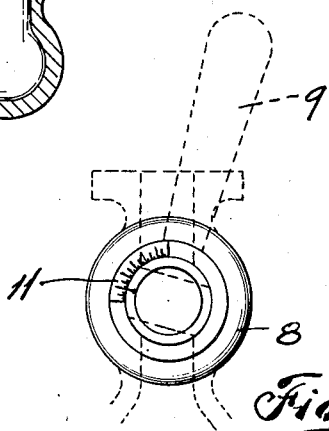
Fig. 4 is a view showing a portion of the pet cock for testing the charge or gases in the cylinder of the engine.
Figure 3:
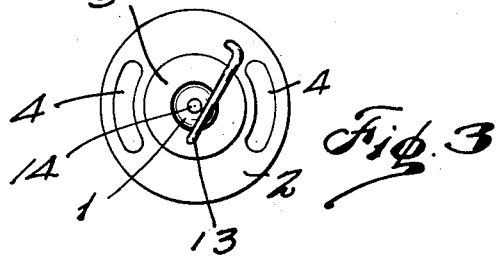
Fig. 3 is a bottom view of the spark plug.

In carrying out the principles of my invention as illustrated in its preferred form in the drawings I have utilized the usual standard form of spark plug 1 of insulating material and fashioned with the thimble or shell 2 of metal, which, as usual is threaded into the walls of the engine casing of the internal combustion engine, and is fashioned with the inner bore or cylinder for the plug, as at 3. For convenience of illustration and description it is assumed that the spark plug will be positioned in a vertical position, as shown in the drawings, and when in such position, the lower end of the plug, it will be seen, is fashioned with a pair of oppositely disposed concentric pockets or circumferentially extending chambers 4, 4 about the center of the shell or thimble which pockets are open at the end of the shell within the cylinder of the engine, and extend up into the shell a distance sufficient to bring them out beyond the exterior surface of the wall of the engine casing or cylinder. It will be apparent that the device is to be threaded into the walls of the engine casing, and that the plug is retained in its shell by the utilization of the customary jam nut 5.

At the inner ends of the pockets 4 of the shell, the shell is transversely bored and threaded as at 6, and one end of this threaded passage is closed by the plug 7 screwed therein to permanently close this end of the bore, while the other end of the bore or passage is adapted to receive a pet cock indicated as a whole by the numeral 8, provided with a fiber handle 9 and constructed so that its elbow or pipe bend 10 may be threaded into the threaded bore 6. It will be obvious that the pet cock and the plug 7 may be interchanged when circumstances require it, but whether one or the other of these threaded passages 6 is used, the pipe 10 communicates with the interior of the cylinder of the engine through the port 10ª by way of the pocket or passage 4, and through manipulation of the pet cock handle, gas may be permitted to flow or escape through the pet cock. The passage and quantity of gas passing through the pet cock may be determined by an index or scale 11 on the cock, and regulated or governed by the valve plug 12 of the pet cock. Thus it will readily be apparent that gas may be taken from the cylinder of the engine in the immediate vicinity of the electrodes or spark plug points 13, for testing, as for example, if the cylinder is firing properly, when the pet cock is opened a puff of gas will be forced out on the compression stroke of the piston, and the puff will be audible. A second blast will then occur when the ignition and explosion take place in the cylinder if all is well; if the second blast does not occur, it will be apparent that the cylinder is not firing, and when the different cylinders of the engine are tested separately the trouble may be quickly ascertained. The test cock must not be opened too wide as the inrush of air, due to suction at the time of the suction stroke of the piston, may cause the mixture of gas about the spark plug to be too lean with consequent mis-firing.

For testing the electrical connections of the engine I utilize the electrical connections of the spark plug, and at the upper end of the stem or rod 14 of the plug I utilize a cap 15 having the screw threaded extension 16, the former embedded in the upper end of the plug, and the latter projecting above the top of the plug. A second screw bar 17 above the screw extension 16 co-acts therewith to form an air gap, and these two elements 16 and 17 form the testing points for the device. The testing points are supported within the insulated head, 18, which is provided with a metallic threaded sleeve 19 on the screw bar 16, and a metallic cup 20 prevents the head from revolving on the threaded extension 16. A clamp nut 21 holds the cup down on the upper end of the spark plug, and the threaded sleeve 22 in the upper end of the head is engaged by the binding nut 23, which secures the electrically connected wires as usual. At the junction for the spark gap between the test points 16 and 17, an aperture 24, extending transversely of the head is provided, to permit access to the points and visibility of the points, and to aid in inspecting the parts, a mirror 25 in the shape of a circular disk is pivoted or swiveled in the two arms or brackets 26 of the supporting tube 27 and the latter is inserted in one end of the aperture and thus supported. When required the reflecting side of the mirror may be turned toward the air gap to aid in adjusting the two test points and when required the rear or back of the mirror, preferably black, is turned toward the gap in order to assist in detecting the spark, the black surface acting as a background as will be readily understood.

It will readily be seen that the gap between the two points 16 and 17 may be varied by turning the screw bar 17 through its binding nut 17 or by using a screw driver in the kerf in the top or upper end of the screw 17, and various tests may be made and conditions determined by observing the spark between the two test points.

Trouble with the ignition, or other electrical connections may readily be detected and remedied by the utilization of the testing device at the head of the spark plug, but it will of course be understood that the spark plug is constantly used for its primary purpose for igniting the charge in the cylinder, the connection being made to the binding nut 23 and thence down through the screw 17, the stem extension 16 and the stem 14 to the electrodes at the lower end 13 of the spark plug.

For instance, if it is found that the electrodes or terminals 13 are too close and the engine is mis-firing, this trouble may be remedied by unscrewing the screw 17 to open the air gap between these two testing points 16 and 17, and the engine will then fire regularly after proper adjustment is had, and similarly, the fact that the spark fails to jump the gap between the two points 16 and 17 would indicate that the two electrodes 13 are too far apart. Tests as to the magneto magnets may also be made, as to determine whether or not they need recharging, and to determine the condition of the electrodes 13 as to whether they are burned, pitted, or out of adjustment, and numerous other tests of the electrical apparatus may be made by utilization of the testing points 16 and 17, as will readily be discovered by one skilled in this art.

What I claim is—

1. The combination with the spark plug, its stem and the threaded extension on the stem, of a head of insulating material threaded on the extension and provided with a transverse opening, a screw threaded into the head in line with the threaded extension to form a spark gap therewith, adjustable means carried by the head and visible through said opening to assist in detecting a spark at the gap, and a binding nut on the head threaded to said screw.

2. The combination with the spark plug, its stem and the threaded extension on the stem, of a head of insulating material threaded on the extension and a locking cup for said head, a screw in the head alined with the extension, and said head having an opening therethrough at the junction of the extension and screw, and a mirror supported in operative position adjacent to the opening.

In testimony whereof I affix my signature.

HOLLEY CARTMILL.